Oct. 2, 1951          V. MUSKA          2,569,865
CYCLONE DUST COLLECTOR
Filed Aug. 21, 1947
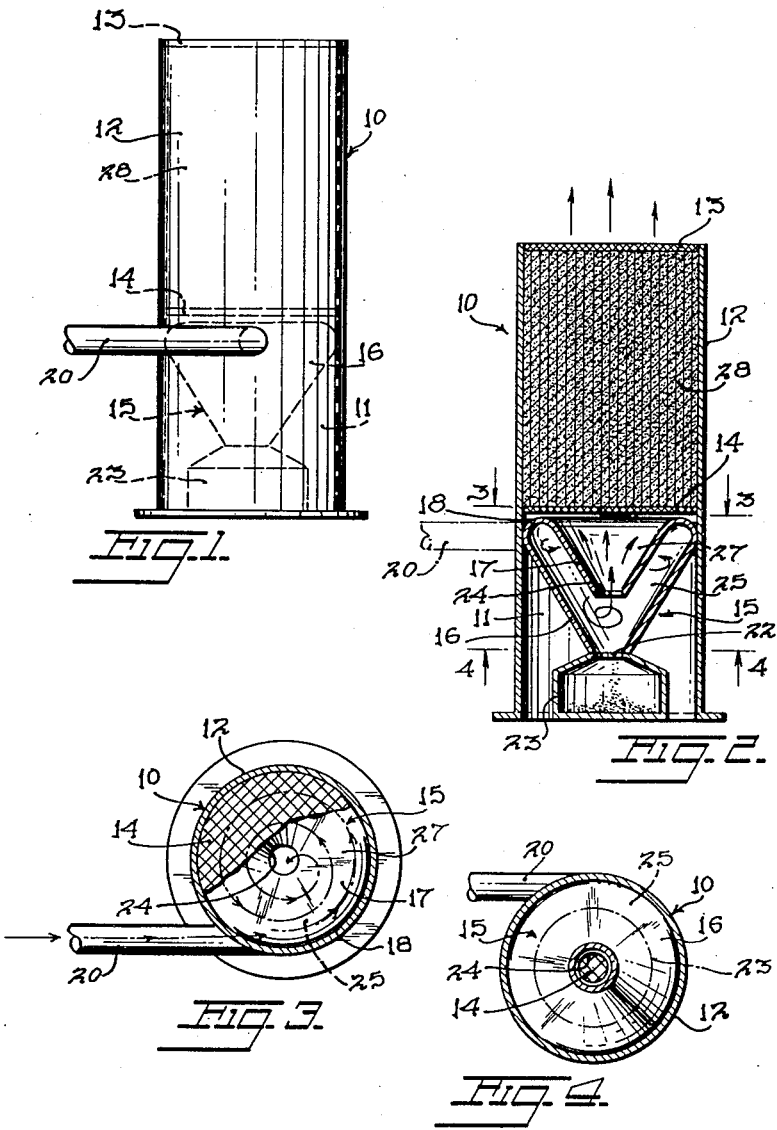
INVENTOR
VOJTECH MUSKA
ATTORNEY Patented Oct. 2, 1951

2,569,865

UNITED STATES PATENT OFFICE 2,569,865

CYCLONE DUST COLLECTOR

Vojtech Muska, Astoria, N. Y.

Application August 21, 1947, Serial No. 769,791

1 Claim. (Cl. 183—85)

This invention relates to an improved means and method of filtering air, for eliminating dust of all kinds, which fills the air in factories, mills and other industrial places.

One of the objects of the invention is to provide a method for circulating dust laden or dust charged air within a circuit to cause automatic and progressive deposition of the dust particles, so that dust, such as that produced in flour, wood, plastic and chemical mills or factories may be separated from the air, with minimum use of filtering mediums constructed to intercept dust particles.

Another object of the invention is the provision of a method for circulating dust charged air in a miniature cyclonic path, to produce a reverse flow and deposition at the point of flow reversal.

Another object of the invention is to provide an apparatus having a material filtering medium, such as cloth or the like, adapted to collect dust from flowing air, with an air circuit constructed to provide a miniature cyclonic flow of the air, to cause the major portion of the dust to settle below in a collecting receiver, and the rest of the dust to be separated by the filtering medium, through which the final flow of the air takes place.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a side elevation of the improved air cleaning apparatus.

Fig. 2 is a vertical sectional view thereof.

Fig. 3 is a horizontal sectional view, taken on line 3—3 of Fig. 2, looking in the direction of the arrows.

Fig. 4 is a similar view, taken on line 4—4 of Fig. 2, looking in the direction of the arrows.

Referring to the drawings, 10 designates a cylinder or other form of a tank or containing body, which is provided with a bottom chamber 11, and an upper chamber 12, having a screen 13 suitably supported at the upper end thereof, which may be of conventional construction.

The upper chamber 12 is separated from the lower chamber by means of the horizontal screen 14, and in the lower chamber 11 an automatic air cleaning device 15 is arranged. This device has an outer frusto-conical wall 16, and an inner frusto-conical wall 17, which is spaced inwardly of the outer wall 16, by the integral ring 18.

The space 19 between the outer wall 16 and the inner wall 17 receives air from the external pipe or conduit 20, which extends through the wall of the cylinder or tank 10, and the entire automatic cleaning device 15 is supported on the wall of the tank or cylinder 10 as by welding 21.

The outer wall 16 is provided with a central discharge opening 22, under which a dust receiver 23 is positioned. The inner wall 17 is provided with a discharge opening 24, which is located in a horizontal plane directly above the discharge opening 22, and which is spaced therefrom a distance shown to be less than one half of the entire vertical depth of the separator 15.

The outer wall 16 thus provides a downwardly narrowing path 25, which receives the dust laden or dust charged air at its upper and larger end from the conduit 20. The air is forced through the conduit 20 by means of a pressure device which may be a rotary blower, and due to the downwardly increasing resistance in the path 25, between the inner and outer wall, develops back pressure directly over the lower discharge opening 22. The lower end of the outer wall 16 is disposed in close relation to the receiver 23, so that there is no opening provided for the escape of the air at this point.

The space 27 within the inner wall 17 and above the upper discharge opening 24 progressively enlarges upwardly, and the air which rises from the discharge opening 24 to flow through the bottom screen 14, and thence through the filtering medium 28, arranged in the upper chamber 12, loses velocity as it flows through a constantly enlarging passage area.

As the upwardly flowing air loses velocity due to the increase in the area of the vertical passage 27, dust which is kept in suspension falls downwardly and passes through the two discharge openings into the dust receiver.

The air stream is first forced to flow downwardly through a passage which progressively narrows in area, and is then automatically reversed to flow upwardly through a passage which progressively enlarges in area. This reversal of the direction of flow of air stream, causes conflicting air currents to be set up over the discharge openings, and settlement or deposition of dust carried by the air results, when the loss of velocity deprives the dust particles.

The dust charge air supply enters the primary circuit path 25 tangentially, so that a downward spinning motion is imparted to the air stream, which causes the dust particles to be thrown by centrifugal action against the inner surface of the outer wall 16, and the friction of this wall produces a dragging effect on the dust particles, and thus aids in their separation from the moving air stream, and the separated dust particles slide downwardly into the dust receiver.

There is a material drop of velocity of the air stream, in the zone directly between the upper and lower discharge opening, due to the fact that at this zone the air of the outer passage is increased, and then the loss of velocity continues above the upper discharge opening.

The entire separating action within the lower chamber of the air cleaning device is automatic, and continuous, and is completed by the action of the filtering cloths or medium in the upper chamber, which separate extremely fine particles of dust which are not released by the reverse flow and centrifugal action of the lower chamber.

The loading of the filtering medium is accordingly reduced to a minimum, so that its effective life is greatly prolonged.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A cyclone for use in a dust separator having an elongated tubular body with a screen mounted in the body intermediate of its ends forming an upper compartment and a lower compartment and a filter within the upper compartment and resting on the screen, said cyclone comprising an outer frusto-conical wall mounted within the lower compartment with its base uppermost and having an apex discharge opening for dust positioned slightly above the bottom end of the lower compartment, a smaller inner frusto-conical wall positioned concentrically within said outer frusto-conical wall with its base uppermost and on a common level with the base of said outer frusto-conical wall, a ring between the bases of said frusto-conical walls supporting said inner wall from said outer wall, said inner wall having a discharge opening for air at a level above and concentric with the discharge opening of said outer wall, a conduit for discharging dust laden air tangentially into the space between the base ends of said frusto-conical walls, a dust receiving container positioned within the lower compartment beneath the discharge opening of said outer wall, said receiving container being of a height equal to the space between the bottom of said outer wall and the bottom of said lower compartment and having a top opening, said top opening of said receiving container being of the same diameter as the bottom discharge opening of said outer wall with the material of said container defining said top opening being in intimate contact with the material of said outer wall defining said bottom opening.

VOJTECH MUSKA.

REFERENCES CITED

The following references are of record in the file of this patent:

UNITED STATES PATENTS

| Number | Name | Date |
| --- | --- | --- |
| 1,426,177 | Garner | Aug. 15, 1922 |
| 1,761,377 | Waring | June 3, 1930 |
| 2,026,834 | Holly | Jan. 7, 1936 |